(12) United States Patent
Bruhn

(10) Patent No.: US 6,347,081 B1
(45) Date of Patent: Feb. 12, 2002

(54) METHOD FOR POWER REDUCED TRANSMISSION OF SPEECH INACTIVITY

(75) Inventor: Stefan Bruhn, Nürnberg (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/115,632

(22) Filed: Jul. 15, 1998

Related U.S. Application Data
(60) Provisional application No. 60/056,444, filed on Aug. 25, 1997.

(51) Int. Cl.[7] ............................................. H04B 7/212
(52) U.S. Cl. ..................... 370/337; 370/318; 704/215; 714/768
(58) Field of Search ................................. 370/337, 347, 370/335, 336, 345, 328, 330, 431, 441, 442, 348, 318; 704/215, 200, 226, 205, 227, 233, 220

(56) References Cited

U.S. PATENT DOCUMENTS

| | | | |
|---|---|---|---|
| 5,426,641 A | 6/1995 | Afrashteh et al. ......... 370/95.3 |
| 5,812,965 A | * 9/1998 | Massaloux .................. 704/205 |
| 5,835,889 A | * 11/1998 | Kapanen ...................... 704/215 |
| 5,936,979 A | * 8/1999 | Jyrkka ......................... 370/330 |
| 5,960,389 A | * 9/1999 | Jarvinen ...................... 704/220 |

FOREIGN PATENT DOCUMENTS

| | | |
|---|---|---|
| GB | 2 256 351 | 12/1992 |
| JP | 07-254 872 | 10/1995 |
| WO | 94/10812 | 5/1994 |
| WO | 96/24200 | 8/1996 |

OTHER PUBLICATIONS

M.R.L. Hodges, "The GSM Radio Interface", *British Telecom Technology Journal*, vol. 8, No. 1, Jan. 1, 1990, pp. 31–43, XP000575496.

* cited by examiner

*Primary Examiner*—Douglas Olms
*Assistant Examiner*—Ricardo M. Pizarro
(74) *Attorney, Agent, or Firm*—Burns, Doane, Swecker & Mathis, L.L.P.

(57) ABSTRACT

A method is disclosed for reducing the power during discontinuous transmission in a digital cellular systems. In order to reduce battery usage and decrease interference to other users, a method is disclosed which employs the transmission of a silence descriptor frame and the following reduction of power once the frame is properly received in the receiver. While the power is reduced there is still the ability to receive and decode inactivity frames.

20 Claims, 5 Drawing Sheets

METHOD FOR POWER REDUCED TRANSMISSION OF SPEECH INACTIVITY

This application claims benefit of U.S. provisional application No. 60/056,444 filed on Aug. 25, 1997.

BACKGROUND

The present invention relates generally to radiocommunication systems and, more particularly, to transmission during periods of speech inactivity.

Many speech communication systems apply discontinuous transmission (DTX) techniques to turn off transmitters in mobile stations (MSs) during periods of silence, e.g., pauses in conversation. This saves battery power and reduces interference caused to other users which are concurrently transmitting over the air interface.

More specifically, however, systems using DTX techniques do not completely stop transmission during periods of inactivity. In order to enable a realistic reproduction at the receiver of background noise at the transmitter, silence descriptor (SID) frames are transmitted from the transmitter to the receiver during the silent periods.

In conventional GSM Enhanced Full Rate (EFR) systems, the SID frames are synchronous to, and aligned with, the Slow Associated Control Channel (SACCH) frame structure. Such systems are described in, for example, the following standards; ETSI TC-SMG: "Digital cellular telecommunications system (Phase 2+); Channel coding", GSM 05.03, version 5.2.1, EISL, November 1996, ETSI TC-SMG: Digital cellular telecommunications system; Substitution and muting of lost frames for Enhanced Full rate (EFR) speech traffic channels", GSM 06.61, final draft version 5.1.1, ETSI, November 1996 and ETSI TC-SMG: "Digital cellular telecommunications systems: Discontinuous Transmission (DTX) for Enhanced Full rate (EFR) speech traffic channels", GSM 06.81, final draft version 5.1.1, ETSI, November 1996.

In these conventional DTX systems there is one SID frame transmitted per 24 TDMA frames (i.e., one SID frame per 480 ms). During the remainder of this period, the MS's transmitter is turned off, unless voice activity resumes. For the SID frame transmission the same channel coding scheme is used as for a regular speech frame. Forty-three bits are used in each SID frame for comfort noise parameters which describe spectral shape and gain of the signal to be reproduced at the receiver. Ninety-five bits are used for a special SID bit pattern to identify the frame as a SID frame and to distinguish it from regular speech frames. The basic DTX principle as described in the GSM Enhanced Full Rate standard is depicted in FIG. 1. Therein, the transmission of active speech frames ends at time T1 with the transmission of a first SID frame which indicates the beginning of a period of silence and conveys the comfort noise parameters. As the period of silence continues, SID update frames are transmitted every 24 frames, e.g., at times T2 and T3. The silence periods ends at time T4 with the resumption of speech frame transmission.

There are several major drawbacks associated with these conventional discontinuous transmission systems. First, the transmitted SID frames are transmitted at relatively high power levels and produce strong interference to other users which are transmitting at the same time. Second, except for the transmitted SID frames, transmission on this channel is otherwise entirely stopped. This latter characteristic of conventional DTX systems is particularly problematic for more recent communication system innovations, such as Adaptive Multi Rate (AMR) for the GSM system. Herein it is necessary to keep track of the current channel state and to have a more or less continuous inband control channel, which both require more or less continuous reception of transmitted frames. Accordingly, it would be desirable to find a solution with the battery conservation benefits of conventional discontinuous transmission on the one hand and, on the other hand, provide continuous (or more frequent) frame transmission to satisfy the requirements of new communication system innovations. Moreover, such a solution also should eliminate the aforementioned interference bursts associated with the SID frame transmission of conventional DTX.

SUMMARY

The foregoing drawbacks and limitations of conventional radiocommunication systems implementing DTX techniques to reduce battery drain in mobile units can be overcome according to exemplary embodiments of the present invention which provide for continuous and discontinuous transmission of SID information during periods of inactivity to allow channel monitoring and inband control data transmission to continue during those periods. At the same time, however, the SID information is transmitted at a reduced power level relative to speech and data transmissions, which is made possible by the use of more powerful error coding techniques for the SID information. Since the SID information takes fewer bits per frame to transmit than speech or data information, it is possible to use the additional bits for coding and therefore reduce the power level for transmission. Moreover, interference associated with powerful SID bursts used in conventional DTX technique is avoided.

Exemplary embodiments of the present invention transmit SID information continuously during the period of inactivity at a reduced power level. However, alternative exemplary embodiments of the present invention may transmit less than continuously, i.e., for periods of time less than or equal to the individual SID bursts used in conventional DTX techniques.

BRIEF DESCRIPTION OF THE DRAWINGS

These and other objects, features and advantages of the present invention will be more readily apparent to those skilled in the art upon reading the following detailed description in conjunction with the drawings wherein.

DETAILED DESCRIPTION

Figure 1:
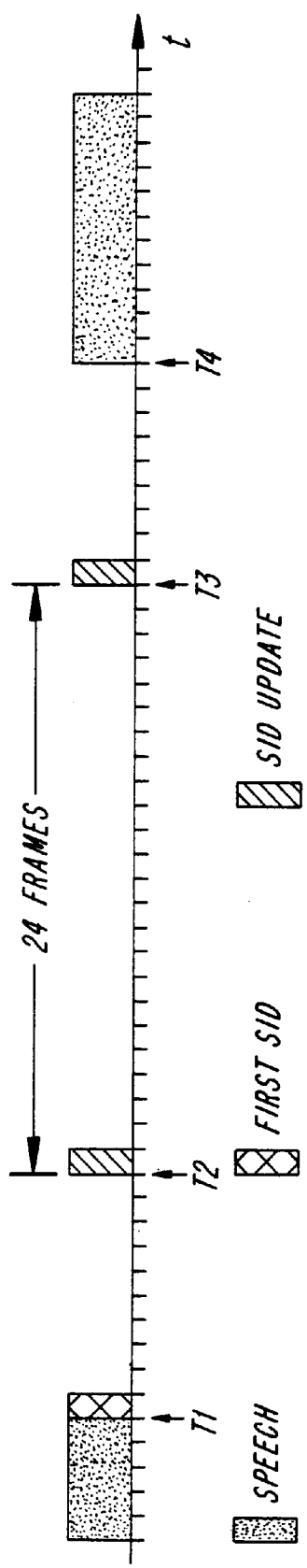
FIG. 1 shows conventional DTX frame transmission scheme for a system operating in accordance with the GSM Standard.

While the present invention will be described in connection with several exemplary embodiments, it will be understood by those skilled in the art that the invention is not intended to be limited to these particular examples. On the contrary, the present invention is intended to cover all alternatives, modifications and equivalent arrangements within the spirit and scope of the invention. For example, while the exemplary embodiments described below are based upon the GSM standard, the present invention can be applied in any other TDMA based system, for example DAMPS, PDC or NMTS. Moreover, the present invention is not limited to access methodologies which include TDMA, but can also be applied to frequency division multiple access (FDMA), code division multiple access (CDMA) or hybrids thereof.

As mentioned above, one object of the present invention is to provide continuous (or more frequent or equal rate) but power reduced transmission during non-speech periods by exploiting the fact that the number of information bits per frame to be transmitted for SID information is much less than that associated with speech frames. This allows additional redundancy (i.e., more code bits) to be used which provides a very high amount of error protection. The resulting gain in error protection permits transmission at a reduced power level while still fulfilling requirements concerning channel error robustness.

The present invention can be implemented in different ways. A first exemplary embodiment uses all of the available gross bit rate to transmit coded SID information to provide a continuous but power reduced transmission during non-speech periods. A second exemplary embodiment, as described below, also reduces the transmission power of the non-speech frames but does not use all of the available gross bit rate to transmit SID information.

For exemplary embodiments employing continuous transmission, the following exemplary parameters are used as a basis for describing these exemplary embodiments. First, comfort noise parameters are encoded with n bits, e.g., with n=43 bits in systems operating in accordance with GSM having conventional discontinuous transmission systems. Second, the comfort noise parameters are updated at a rate of 1 SID frame per p transmission frames. That means that, except for the first SID period after speech and the last SID period before speech, each SID period has a duration of p frames. A suitable choice in the example solution is p=12 frames. Finally, each channel frame consists of g bits, e.g., g=456 bits in the case of a GSM frame.

In these exemplary embodiments, different channel coding schemes are used depending on the kind of the frame (speech or SID) being transmitted. Speech frames are conventionally channel encoded using existing methods, e.g., according to the GSM standard. However, the SID information is more highly protected and, therefore, uses a different channel coding scheme.

Thus, channel coding of the SID information involves mapping the SID information bits belonging to one SID period onto the available gross bits in such way that the SID information is most suitably protected against channel errors. For example, the n (e.g., 43) information bits of one SID period could be encoded with up to p (e.g., 12) channel frames of g (e.g., 456) bits each, i.e., with a maximum of p times g (e.g., 5472) channel bits. The implementation of such a highly protective channel coder may, however, be overly complex and unnecessary to achieve the reduction in power level desired.

Thus, another exemplary embodiment involves encoding the n SID information bits using any suitable conventional channel coding method, e.g., convolutional coding, such that they fit into a single channel frame. This single channel frame is then repeatedly sent for the duration of the SID period. Part of the single channel frame can be used for the convolutionally encoded SID information and the remaining gross bits of the channel frame can be used for a special SID bit pattern which marks the frame as a SID frame. Optionally, these remaining bits could also be used for other purposes, e.g., for an inband channel.

The task of the channel decoder is to identify the received frame as a speech frame or a SID frame and, depending on that result, to apply the appropriate channel decoding method. First, decoding examples will be described, then an exemplary identification algorithm.

Figure 2:
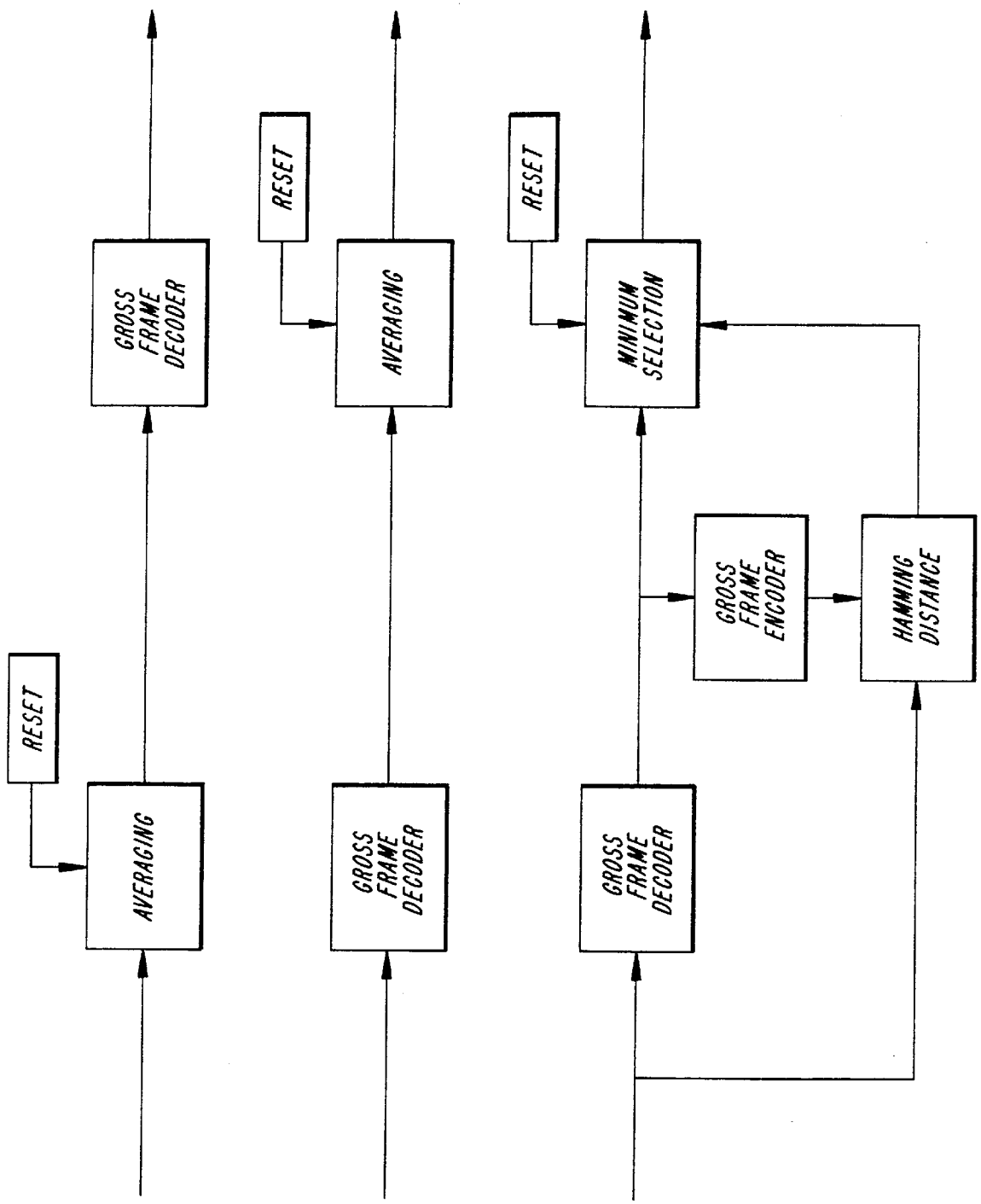
FIGS. 2a, 2b, and 2c show SID frame channel decoding schemes according to exemplary embodiments of the present invention.

Speech frames are channel decoded by any suitable conventional method, e.g., according to the GSM standard. The SID frame channel decoder can be implemented using any suitable conventional channel decoder which permits decoding single channel frames, e.g., Viterbi decoding, but modified to take advantage of the repetition of SID frame transmission. Example solutions are illustrated in FIGS. 2($a$)–2($c$). Specifically, as shown in FIG. 2($a$), an average of the soft information belonging to the incoming channel frames prior to channel frame decoding is one possible solution. Second, as shown in FIG. 2($b$), individual (soft-output) decoding of the incoming channel frames and majority decision of the decoded SID net bits can be performed. The majority decision is taken by averaging the net bit output of the channel frame decoder. Finally, as shown in FIG. 2($c$), individual decoding of the incoming channel frames and selection of the most error free frame can be used to decode SID frames. The number of gross bit errors is estimated by e.g., re-encoding the decoded sequence and calculating the Hamming distance to the received channel frame gross bits.

For identifying an incoming frame as either a speech frame or as a SID frame, a trial decoding method can be used. When the incoming frame is severely corrupted by channel errors such that it cannot be decoded as either a speech frame or as a SID frame, incoming frames can also be classified as bad, i.e., unusable frames. The frame type decision made in the decoder is based on a number of different measured frame characteristics which characteristics can be derived in various receiver stages, e.g., in the channel decoder or the equalizer.

Examples of suitable characteristics for speech frame channel decoders are as follows. First, there are cyclic redundancy check (CRC) bad frame indicators, e.g., according to the GSM standard. Second, estimates of the number of gross bit errors in the channel frame, here referred to as SFQ-SP, can also be used as a frame characteristic. Such a frame characteristic can be determined by re-encoding of the decoded frame and calculating the Hamming distance to the received channel frame gross bits. When used, non-existence of the SID bit pattern is also indicative of the occurrence of speech frames.

Figure 3:
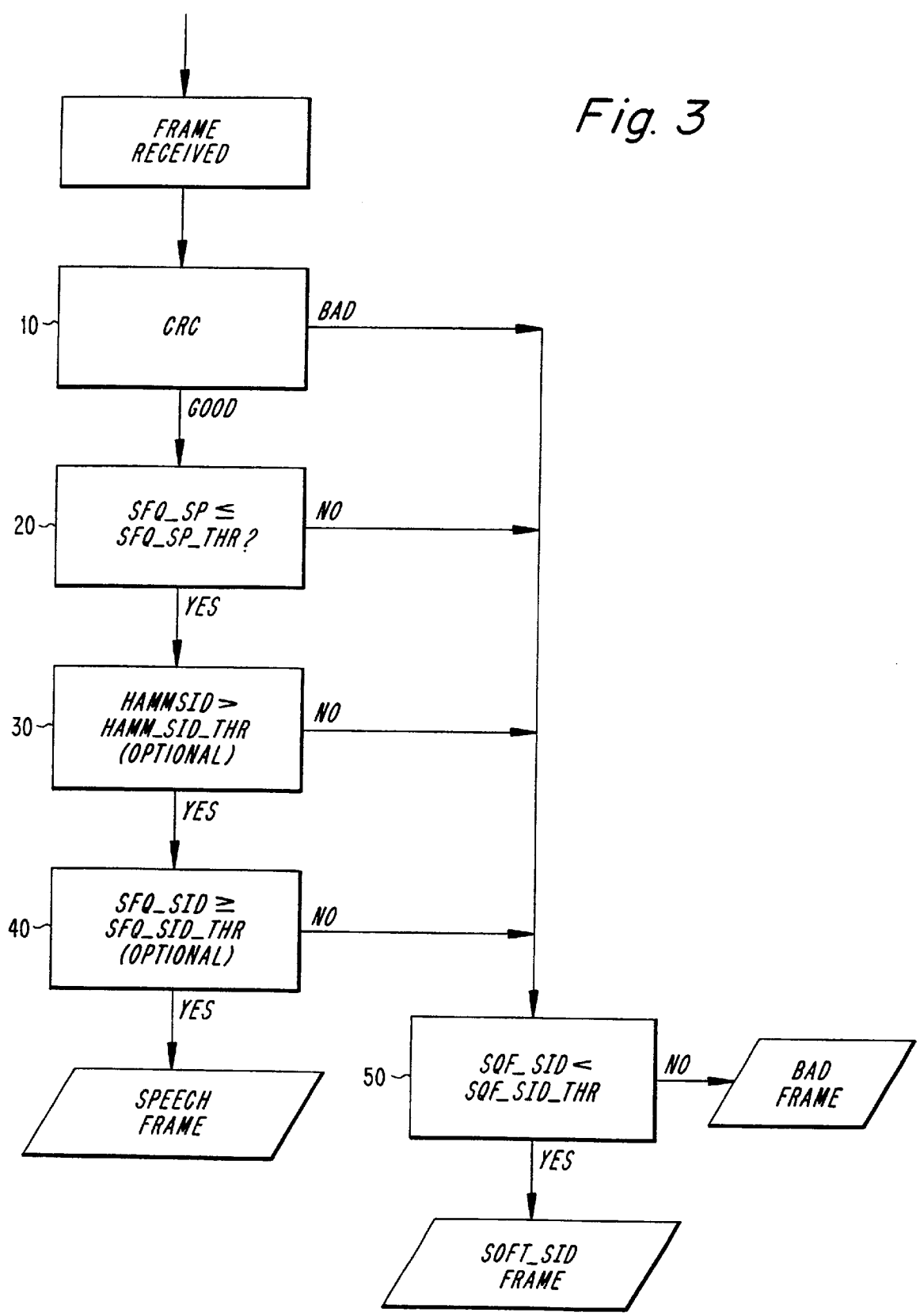
FIG. 3 is a flow diagram of an exemplary received frame algorithm according to exemplary embodiments of the present invention.

Examples of suitable characteristics for SID frame channel decoders are as follows. First, an estimate of the number of gross bit errors in the channel frame can be made (when applying the SID frame channel decoder), here referred to as SFQ-SID. Again, this characteristic is determined by re-encoding the decoded SID bits and calculating the Hamming distance to the received gross bits. Second, determination of the Hamming distance to the special SID bit pattern (if any) used for marking SID frames. These characteristics are utilized in the identification scheme described below and with respect to the flow diagram of FIG. 3.

First, a frame is considered to be a speech frame if CRC indicates a good speech frame (step 10), and SFQ-SP is below a threshold SFQ-SP-THR (step 20), and (optionally) the Hamming distance to the SID bit pattern HAMM_SID is above a threshold HAMM_SID_THR (step 30) and (optionally) SFQ_SID is above or equal a threshold SFQ_SID_THR (step 40). Otherwise it is considered to be a SID frame if SFQ_SID is below the threshold SFQ_SID_THR (step 50). Otherwise the frame is considered a bad frame.

The detected frame type is indicated by the flags SPEECH, SOFT_SID or BAD_FRAME, respectively. Only one of the flags is active at a time. The omission of the optional condition concerning the SFQ_SID measure for deciding on a speech frame makes it possible to run the SID frame decoder only if an update of the SID information is required. This can serve for reducing the computational complexity. Note, because SID frames are transmitted with lower power relative to speech frames, alternative measures could also be employed for frame type identification. Suitable frame characteristics like transmission power estimates could e.g., be taken from the equalizer and used to identify a received frame as a speech frame or a SID frame.

For each frame identified as a bad frame, the corresponding decoded net bit frame should contain the decoded sequence of the speech channel decoder. This can improve the operation of the error concealment function in the speech decoder.

This exemplary embodiment also includes implementations wherein a discontinuous transmission handler is located for example, close to the speech encoder and a transmission radio subsystem (RSS) is located close to a channel encoder and radio transmitter. It is further assumed that, as in the GSM standard, the discontinuous transmission (TX DTX) handler continuously passes traffic frames (i.e., uncoded information frames) to the transmission radio subsystem (TX RSS). These frames are marked with a flag (SP flag) which indicates the frame type, i.e., speech or SID.

This exemplary embodiment handles the processing of frames in the transmission radio subsystem (TX RSS) which are marked as SID frames, since such processing is different than conventional SID techniques for the reasons set forth above. Speech frames, on the other hand, are conventionally processed, e.g., according to the GSM standard. For SID frame transmission a periodic flag is defined as the Silence Update Flag (SUF). This flag is set once in the last frame of each SID period. The SUF is also available at the receiving side. To ensure this functionality, the SUF can, for example in a GSM system, be aligned with the SACCH frame structure or it could, for example, be synchronized during call setup. The exemplary SID frame processing procedure includes the following steps.

Figure 4:
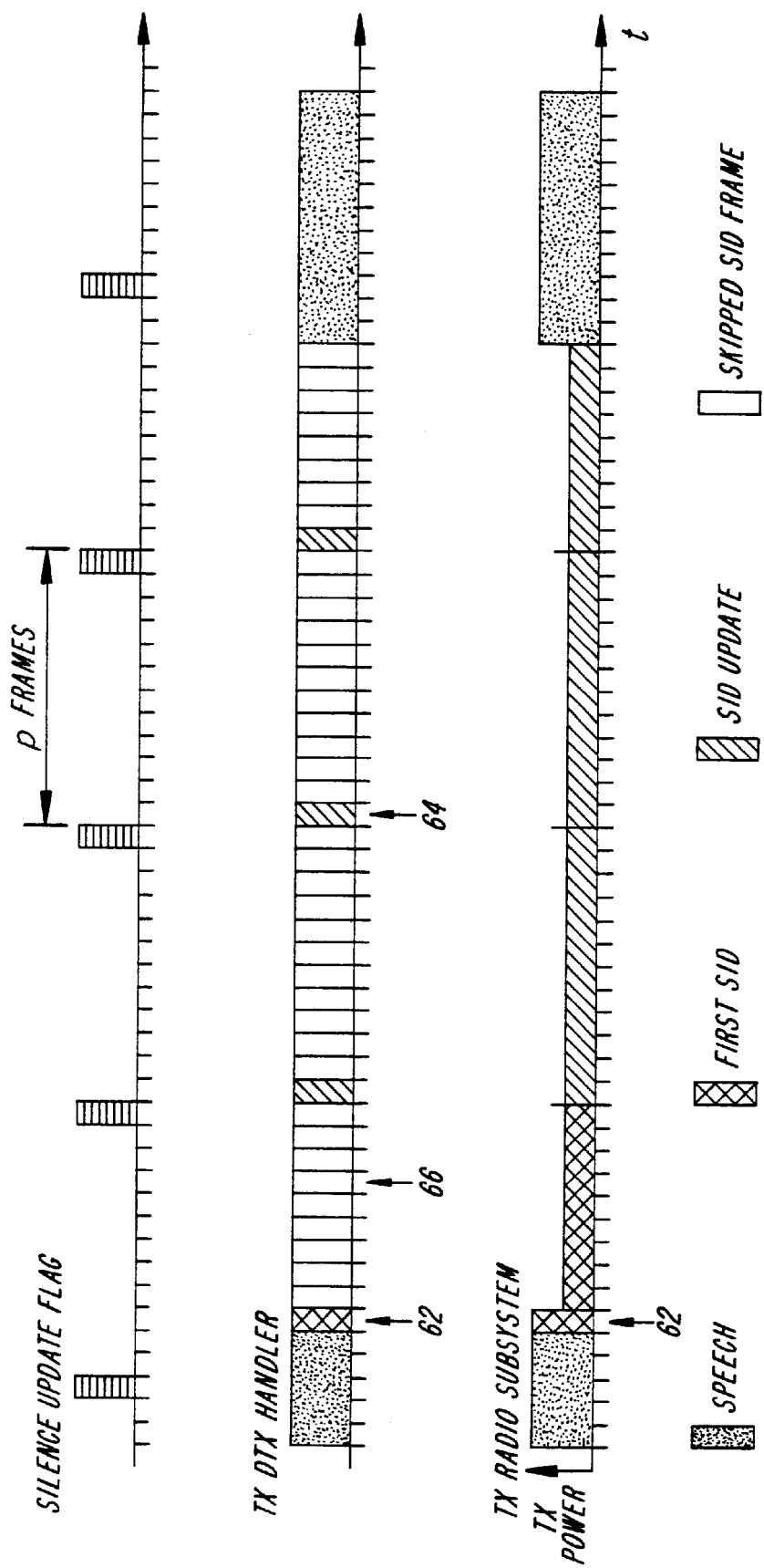
FIG. 4 shows a traffic transmission scheme according to exemplary embodiments of the present invention.

First, if the frame is the first SID frame after at least one speech frame the frame is identified as a "first SID frame", e.g., frame 62 as shown in FIG. 4. The net SID bits of the first SID frame are channel encoded as described above to provide greater error protection than the previously transmitted speech frame. The corresponding gross (encoded) bit channel frame is handled in the same way as speech channel frames. Specifically, the coded first SID frame is passed through subsequent processing units, such as an interleaver and modulator used in a conventional manner, and it is transmitted with the regular power level which is used for speech frame transmission. Moreover, the gross bit channel frame is stored in a storage unit.

Next, if the frame is not a first SID frame and if the frame is the first frame following a set SUF, the frame is referred to as a SID update frame, e.g., frame 64 in FIG. 4. The SID update frame is processed in the same way as first SID frames, except that it is transmitted at a reduced transmission power level. In particular, it is also stored in the storage unit.

Finally, all other SID frames (neither first SID nor SID update) arriving from the transmission DTX handler are skipped, e.g., frame 66. Instead, the previously stored channel encoded SID frame (first SID or SID update) is retransmitted at the reduced TX power level as SID update frames.

Note that only first SID frames are sent with regular TX power. All other SID frames are transmitted at the reduced power level, as seen in the different power levels illustrated in the RX radio subsystem graph of FIG. 4. Full power transmission of the first SID frame ensures proper detection of the beginning of a non-speech period.

Due to diagonal interleaving of the channel encoded gross bit frames over more than one TDMA frame, the situation may occur where a TDMA frame contains parts of one or more channel frames to be sent at regular power level and parts of one or more channel frames to be sent with reduced TX power. One possible solution for this situation is to transmit a TDMA frame at regular power level if it contains a part of a channel frame which is designated for transmission at regular power, e.g., a first SID frame.

Analogous to the transmission side, this exemplary embodiment also handles implementations having a receiver radio subsystem (RSS), located e.g., close to a radio receiver, equalizer and channel decoder, and an RX DTX handler, located e.g., close to a speech decoder and error concealment unit. It is further assumed that the RX RSS continuously passes channel decoded traffic frames (i.e., net bit frames) to the RX DTX handler which is compliant with the GSM standards in this exemplary embodiment. In particular, the frames are marked with flags indicating the detected frame type, i.e., speech or SID, (ternary SID flag), and a bad frame indicator (BFI).

This exemplary embodiment further handles the control of the channel decoding and frame type identification methods in the RX RSS and the mapping of the decoding and identification result to the input format of the RX DTX handler. As mentioned above, the Silence Update Flag (SUF) is available, as in the TX RSS. This exemplary frame reception procedure includes the following steps.

First, channel decoding and frame type identification are performed, e.g., as discussed above with respect to FIG. 3. Outputs are the decoded net bit frame and, as an identification result, the flags SPEECH, SOFT_SID and BAD_FRAME. Second, the minimum selection units of the SID frame channel decoder are reset if SPEECH flag or SUF is active, respectively.

Figure 5:
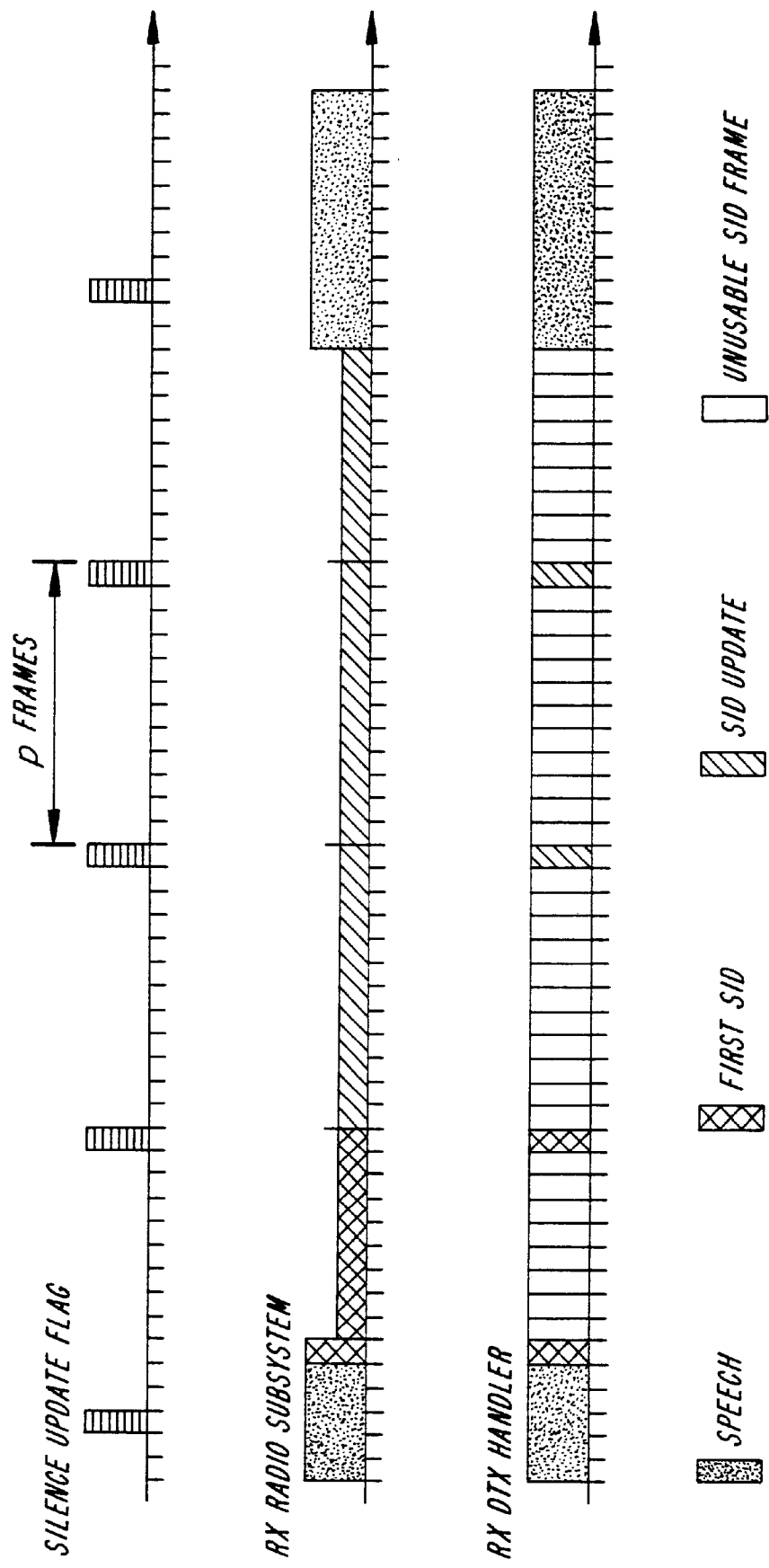
FIG. 5 shows a frame processing scheme according to the present invention applied to a GSM system.

Third, the first SID frame after speech is indicated. A flag, called FIRST_SID serves to provide this indication. FIRST-SID becomes active: (1) if the SOFT_SID flag is active and the SPEECH flag was active in the preceding frame or (2) if the SOFT-SID flag is active and the BAD_FRAME flag was active for one or more consecutive frames following a frame with an active SPEECH flag. The SOFT-SID flag is reset if the FIRST_SID flag is active (set). Finally, the flags SPEECH, FIRST_SID, SOFT_SID, BAD_FRAME and SUF are mapped to the flags of the RX DTX handler, SID and BFI, according to Table 1, shown below. The general frame processing of the reception side is illustrated by FIG. 5.

TABLE 1

Mapping of RX RSS flags to RX DTX handler flags

| RX RSS flags | RX DTX handler Flags | | |
|---|---|---|---|
| | BFI | SID | comment |
| SPEECH | 0 | 0 | Good speech frame |
| FIRST-SID | 0 | 2 | Valid SID frame |
| SOFT_SID, SUF | 0 | 2 | Valid SID frame |
| SOFT-SID, ¬SUF | 1 | 0 | Unusable frame |
| BAD_FRAME | 1 | 0 | Unusable frame |

The aforedescribed exemplary embodiments provide continuous transmission with reduced power during each SID period. However, it is also possible according to the present invention to apply the same concepts described above without transmitting continuously. The SID information could be coded to provide less redundancy (i.e., a lower error protection level) such that the SID information is transmitted over every nth gross bit frame of the SID period. For n=1, continuous transmission, described above, occurs. For n greater than one, discontinuous transmission occurs. Although less error coding protection is supplied, there is still considerably more channel error protection than in conventional discontinuous transmission schemes, leaving the freedom for reducing the transmission power. Moreover, although not continuously transmitting, transmissions are made more frequently than conventional DTX techniques, thereby providing systems, e.g., Adaptive Multi Rate systems, a sufficient opportunity for channel measurement.

An exemplary embodiment of the present invention which provides for discontinuous transmission will now be described. At the transmitter side, the SID information bits belonging to one SID period are channel encoded with a code rate that the resulting gross bits fit into the number of gross bit frames to be used for transmission. This number of gross bit frames can be determined based upon, for example, the time of transmission desired per SID period. Even if only one gross bit frame is transmitted per SID period, within that gross bit frame, logical subframe structures can be defined, and the repetition of SID bit patterns described above can still be applied.

At the receiver side, any known channel decoder can be applied which is suitable to decode the transmitted gross bits belonging to the SID period. In particular, if the above-described method with repeated gross or subframe transmission is used, then the decoding methods described above with respect to the channel decoder and FIG. 2 are applicable.

A modification of the above-described method is possible considering the fact that, due to diagonal interleaving of the gross bit frames over n channel frames, each gross bit frame to be transmitted is actually sent using n channel frames. Thus, a method for transmitting discontinuously (for example every mth frame where m is greater than or equal to n) which ignores this fact uses only a fraction, i.e, 1/n, out of each of the channel frames. The rest remain unused. One alternative is to not use diagonal interleaving during periods of speech inactivity. If no diagonal interleaving is employed, then all available gross bits of the channel frames are used for the gross bit frames. In this case, the actual SID frame transmission energy is reduced (even by keeping the SID frame transmission power constant). As an alternative, in addition to the conventional interleaving scheme, a second scheme can be employed which fills the channel frame parts with gross bits which are otherwise left unused. In this case, a higher gross bit rate is available for transmitting the SID information.

Both the continuous and discontinuous transmission are also applicable in systems which work with a time variant SID period. Such situations occur for example in case where SID updates are only performed if the comfort noise parameters have changed by more than some predefined amount.

Thus transmission schemes according to the present invention create less interference than conventional DTX schemes as full power interference bursts due to the SID frame transmission are eliminated or reduced. Furthermore, such schemes can result in higher TX power savings than systems with conventional DTX.

System according to the present invention also support, in contrast to conventional DTX schemes, continuous inband channels (i.e., using the additional bandwidth not required by the SID information during continuous or less than continuous transmission for periods of silence) and continuous channel estimation. Also, this can lead to more reliable channel quality estimation and yield its gains at higher SID update rates than e.g., systems according to GSM. This may result in a more precise background noise representation, possibly resulting in better subjectively perceived performance. Finally, such methods do not require, for example in a GSM application thereof, the SID updates frames to be aligned either in phase or in frequency with the SACCH frame structure. Thus, DTX operation in MS to MS connections is simplified as no SID information need to be delayed.

It will be further appreciated by those skilled in the art that the present invention can be embodied in other specific forms without departing from the spirit or characteristics thereof. The presently disclosed embodiments are therefore considered in all respects to be illustrative and not restrictive. The scope of the invention as indicated by the appended claims, rather than the foregoing description, and all changes that come within the meaning and range of equivalence thereof are intended to be embraced therein.

What is claimed is:

1. In a TDMA radio communication system having a transmitting and a receiving end, operating at a frame transmission rate R, and having a speech traffic channel on which the source signal is transmitted in at least two modes, of which one mode is applied during periods of inactive speech, a transmission method for source encoded speech inactivity frames operating at a speech inactivity frame rate r being smaller than rate R, comprising:

using a transmission frame rate higher than r or equal to r for the transmission of channel error protected speech inactivity frames;

reducing the transmission power by an amount such that the transmission power is still sufficiently high for the receiving end to decode the inactivity frames within some predetermined quality criterion, and at the transmitting end of the link:

transmitting at least a first frame which is encoded as a speech inactivity frame, immediately following at least one frame which has not been encoded as speech inactivity frame, at a transmission power level which is not reduced by the same amount as the power level being used for other speech inactivity frames.

2. In a TDMA radio communication system having a transmitting and a receiving end, operating at a frame transmission rate R, and having a speech traffic channel on which the source signal is transmitted in at least two modes, of which one mode is applied during periods of inactive speech, a transmission method for source encoded speech inactivity frames operating at a speech inactivity frame rate r being smaller than rate R, the method comprising:

using a transmission frame rate higher than r or equal to r for the transmission of the channel error protected speech inactivity frames;

reducing the transmission power by an amount such that the transmission power is still sufficiently high for the receiving end to decode the inactivity frames within some predetermined quality criterion; and at the transmitting end of the link:

for each of the source encoded speech inactivity frames applying channel error protection such that the results gross bits fit into a single gross bit frame; and sending the gross bit frame repeatedly at maximum until the time instant of the next source encoded speech inactivity frame.

3. The method of claim 2, characterized in that the receiving end of the link performs averaging of the received gross bit frames prior to channel decoding.

4. The method of claim 2, characterized in that the receiving end of the link performs individual channel decoding of each received gross bit frame and that it performs majority decision decoding for deriving the source encoded speech inactivity frames.

5. The method of claim 2, characterized in that the receiving end of the link performs individual channel decoding of each received gross bit frame and that it selects that decoded frame as the representative of the source encoded speech inactivity frame from which gross bit frame has the least number of estimated gross bit errors.

6. The method of claim 1, characterized in that a logical subframe structure is defined within the speech inactivity gross bit frames.

7. The method of claim 6, characterized in that the speech inactivity frame transmission rate is equal to the speech inactivity frame rate r.

8. The method of claim 1, characterized in that the inactivity frame rate is not constant.

9. In a TDMA radio communication system having a transmitting and a receiving end, operating at a frame transmission rate R, and having a speech traffic channel on which the source signal is transmitted in at least two modes, of which one mode is applied during periods of inactive speech, a transmission method for source encoded speech inactivity frames operating at a speech inactivity frame rate r being smaller than rate R, comprising:

using a transmission frame rate higher than r or equal to r for the transmission of the channel error protected speech inactivity frames; and reducing the transmission power by an amount such that the transmission power is still sufficiently high for the receiving end to decode the inactivity frames within some predetermined quality criterion; wherein the receiving end of the link detects the coding mode, which has been applied by the transmitting end, by applying a decision algorithm for estimating the most likely coding mode of the gross bit frame, based on measures which are derived by at least one of the following steps:

applying the channel decoder belonging to at least one coding mode and searching in the decoded net bits for a characteristic bit pattern identifying mode, or searching in the gross bit frame for a characteristic bit pattern identifying the coding mode.

10. In a TDMA radio communication system having a transmitting and a receiving end, operating at a frame transmission rate R, and having a speech traffic channel on which the source signal is transmitted in at least two modes, of which one mode is applied during periods of inactive speech, a transmission method for source encoded speech inactivity frames operating at a speech inactivity frame rate r being smaller than rate R, comprising:

using a transmission frame rate higher than r or equal to r for the transmission of the channel error protected speech inactivity frames; and reducing the transmission power by an amount such that the transmission power is still sufficiently high for the receiving end to decode the inactivity frames within some predetermined quality criterion, wherein the receiving end of the link detects the coding mode, which has been applied by the transmitting end, by means of trial decoding of the received gross bit frames which executes at least partly the decoders of at least two coding modes and in which a coding mode decision algorithm selects, based on measures which are taken from the different executed channel decoders, the estimated most likely coding mode and the correspondingly decoded net bit frame.

11. The method of claim 9, characterized in that the receiving end of the link may classify the decoded net bit frame as unusable.

12. The method of claim 9, characterized in that coding mode decision algorithm in the receiving end of the link bases the decision on at least one of the following measures:

measures which are taken from the different channel decoders belonging to the different coding modes, measures which are taken from the source decoder, measures which are taken from the receiver components up to and including the equalizer.

13. The method of claim 12, characterized in that coding mode decision algorithm in the receiving end of the link bases the decision on the knowledge of different transmission power levels used for frames encoded in different coding modes.

14. The method of claim 1, characterized in that the radio communication system is a FDMA radio communication system.

15. The method of claim 1, characterized in that the radio communication system is a CDMA radio communication system.

16. A TDMA radio communication system, comprising:

means for transmitting speech information using a first type of error correction coding;

means for transmitting silence information using a second type of error correction coding, wherein said second type of error correction coding has greater redundancy that said first type of error correction coding; and wherein said means for transmitting speech information transmits at a higher average power level that said means for transmitting silence information.

17. The radiocommunication system of claim 16, wherein said means for transmitting silence information transmits continuously during periods of silence.

18. The radiocommunication system of claim 16, wherein said means for transmitting silence information transmits discontinuously during periods of silence.

19. The method of claim 10, characterized in that the receiving end of the link may classify the decoded net bit frame as unusable.

20. The method of claim 10, characterized in that coding mode decision algorithm in the receiving end of the link bases the decision on at least one of the following measures:

measures which are taken from the different channel decoders belonging to the different coding modes, measures which are taken from the source decoder, measures which are taken from the receiver components up to and including the equalizer.

* * * * *